United States Patent [19]

Saito et al.

[11] Patent Number: 5,887,143
[45] Date of Patent: Mar. 23, 1999

[54] APPARATUS AND METHOD FOR SYNCHRONIZING EXECUTION OF PROGRAMS IN A DISTRIBUTED REAL-TIME COMPUTING SYSTEM

[75] Inventors: Masahiko Saito, Hitachi, Japan; Gul A. Agha, Urbana, Ill.

[73] Assignee: Hitachi, Ltd., Tokyo, Japan

[21] Appl. No.: 548,617

[22] Filed: Oct. 26, 1995

[51] Int. Cl.⁶ ............................. G06F 15/16; H04L 7/00
[52] U.S. Cl. ......................... 395/200.78; 395/200.3; 395/553; 395/557; 395/677
[58] Field of Search .................... 395/671, 672, 395/673, 674, 200.01, 200.3, 553, 677, 200.78, 551, 557

[56] References Cited

U.S. PATENT DOCUMENTS

| | | | |
|---|---|---|---|
| 4,816,989 | 3/1989 | Finn et al. | 395/200.08 |
| 4,866,606 | 9/1989 | Kopetz | 395/553 |
| 4,937,741 | 6/1990 | Harper et al. | 395/553 |
| 5,202,987 | 4/1993 | Bayer et al. | 395/672 |
| 5,278,975 | 1/1994 | Ishihata et al. | 395/553 |
| 5,402,394 | 3/1995 | Turski | 368/10 |
| 5,434,995 | 7/1995 | Oberlin et al. | 395/553 |
| 5,550,873 | 8/1996 | Dolev et al. | 375/354 |
| 5,694,542 | 12/1997 | Kopetz | 395/185.02 |

Primary Examiner—Eddie P. Chan
Assistant Examiner—Hong C. Kim
Attorney, Agent, or Firm—Antonelli, Terry, Stout & Kraus, LLP

[57] ABSTRACT

A distributed computing system including a plurality of computers, wherein the execution of programs by the computers to perform real-time tasks are synchronized with each other. Each of the computers includes a local clock which is synchronized with the local clocks of the other computers and a start time determining apparatus for determining execution time of a program to be executed by the computer. The program to be executed by the computer is executed in synchronism with programs in the other computers under timing constraints. The execution time is determined by the start time determining apparatus by negotiating with the start time determining apparatus of the other computers. Each of the computers further includes scheduling apparatus for scheduling the execution of the program to be executed by the computer based on the execution time negotiated by the start time determining apparatus, and a synchronized sporadic server which is executed periodically and at the same time as the execution of the synchronized sporadic servers on the other computers. The synchronized sporadic server supports the scheduling apparatus to schedule the execution of programs based on the timing constraints imposed by the start time determining apparatus.

2 Claims, 9 Drawing Sheets

| TYPE | EXAMPLE OF TIMING CONSTRAINTS |
|---|---|
| SIMPLE TIMING CONSTRAINTS | TASK RELEASE TIME DEADLINE |
| SYNCHRONIZED TIMING CONSTRAINTS | SIMULTANEOUS EXECUTION OF MULTIPLE TASKS SPECIFICATION OF TIME DIFFERENCE BETWEEN MULTIPLE TASK EXECUTION |

ESTIMATED RELEASE TIME = CURRENT TIME
+ WORST CASE COMMUNICATION DELAY
+ MULTICAST MESSAGE HANDLING TIME
+ SCHEDULING DELAY
+ LOCAL CLOCK SKEW

F/G. 6

APPARATUS AND METHOD FOR SYNCHRONIZING EXECUTION OF PROGRAMS IN A DISTRIBUTED REAL-TIME COMPUTING SYSTEM

BACKGROUND OF THE INVENTION

The present invention relates to a distributed computing system having a plurality of computers connected to a network for cooperatively executing a plurality of programs. More particularly, the present invention relates to an apparatus and method for a distributed computing system for improving timing constraints on the release time, deadline and execution time of the programs to realize real-time synchronized execution of the programs.

Although distributed computing systems are used extensively in the academic computing area and partially in the industrial computing area, developers still hesitate to introduce distributed computing into critical real-time computing systems. Real-time computing systems are computing systems such as plant control systems, aviation control systems, traffic control systems, factory automation systems and satellite control systems. One of the major difficulties of such computing systems is the timing of computations. These systems operate incorrectly if the specified timing constraints of the computations are violated.

In other words the correct operation of real-time computing systems depends not only on the correct operation of the logical behavior of the systems but also on the timing of the processes performed by the systems. These systems fail to operate correctly if the specified timing constraints of the computations are violated.

When developing a distributed real-time computing system having controllers located in different places, the key factor is the coordination between computing nodes. For example, a distributed real-time computing system such as a robot, as shown in FIG. 3, has two communicating nodes controllers 321 and 322 for controlling two robot arms 331 and 332 of the robot. One of the robot arms 331 passes an object 34 to the other robot arm 332. The controllers 321 and 322 includes a left arm control 351 and a right arm control 352. In the robot the timing of the release action of the one robot arm 331 and the grab action of the other robot arm 332 is important. Thus, unless the release action and the grab action occur within a limited time, the object 34 will drop from the robot arms 331 and 332. If these tasks are statically schedulable (i.e., the time to pass the object is statically determined) local schedulers of the robot can execute these tasks by a static table-driven approach as described in "Scheduling Preiodically occurring Tasks on Multiple Processors", Information Processing Letters, Vol. 12, No. 1, February 1981 by E. L. Lawler, et al. and "Allocation and Scheduling of Complex Periodic Tasks", 10th International Conference on Distributed Computer Systems, June 1990 by K. Ramamrithan so that timing constraints of the release and grab actions are satisfied. However, in the case where the time for the robot arm 331 to release the object 34 is determined dynamically, static scheduling with a fixed synchronization point does not work.

A more general example of a distributed real-time computing system is a control system with multiple input devices (sensors) and multiple output devices (monitors, plotters and so on). In a dynamically changing environment, it is important to read the values from all input devices simultaneously or to write the values to all output devices within a limited time period.

Thus, in constructing distributed real-time computing systems, timing constraints are necessary not only on the execution of tasks but also on the coordination between tasks. Therefore, the aspect of coordination, namely synchronization in the real-time environment is important.

A number of research activities have been conducted in real-time computing, yet none of them have been completely successful on large distributed real-time computing systems. The main reason for this is that large distributed real-time computing systems have many unpredictable parts and that the distributed nature of such systems prevents the performing of precise timing analysis.

One of the approaches for implementing distributed real-time computing systems by relaxing the complexity of such systems is to decompose end-to-end timing requirements into a set of intermediate timing constraints on multiple tasks as described in "Distributed Pipeline Scheduling: End-to-End Analysis of Heterogeneous Multi-Resource Real-Time systems", Proc. 15th Int'l. Conf. on Distributed Computing Systems, pp. 204–211, June 1995 and "Guaranteeing End-to-End Timing Constraints by Calibrating Intermediate Processes", Proc. IEEE Real-Time Systems Symp., December 1994 by R. Gerber, et al. Each task has such deadline that, when combined with one another satisfies the end-to-end deadline. These approaches usually lead to time-oriented decomposition where a job is decomposed into temporally pipelined tasks a job consists of multiple tasks (modules). For example, image processing is a job that consists of tasks such as filtering segmentation and text recognition. In using this approach, because it does not take care of the inherent parallelism within one job, although it is possible to deploy parallelism with multiple jobs executing in a pipelined manner, the analysis on the interaction between tasks always focuses on resource sharing and data/control flow dependency.

The algorithms proposed in "Multiprocessor Scheduling in a Hard Real-Time Environment", Proce. 7th Texas Conf. on Computer Systems, November 1978 by A. K. Mok, et al.; "The Design of Real-Time Programming Systems Based on Process Models", Proc. IEEE Real-Time System Symp., December 1984 by A. K. Mok and "Efficient Scheduling Algorithms for Real-Time Multiprocessor Systems", IEEE Trans. on Parallel and Distributed Systems, Vol. 1, No. 2, pp. 184–194, April 1990 by K. Ramamrithan, et al. are scheduling algorithms for multiprocessor systems based on the assumption of limited interdependency between the tasks. That is, each task has its own worst computation time, deadline, and resource requirement.

"The Design of Real-Time Programming Systems Based on Process Models", Proceedings of IEEE Real-Time Systems Symposium, 1984 by A. K. Mok proposes Rate Monotonic Scheduling and Deadline Monotonic Scheduling for ensuring the timing constraints on each task. Rate monotonic scheduling is the scheduling method which executes the task with the shortest period first. Deadline monotonic scheduling schedules tasks in the order that the nearest deadline task is executed first. Both scheduling methods are based on the tasks which are executed periodically and assume that such tasks have fixed periods. However, when the parallelism within a job to utilized multiple processors is deployed the assumption of limited interdependency between tasks does not work. Thus, tasks executable in parallel within a job are not independent in terms of the timing of synchronization of execution between the tasks. These tasks usually coordinate with one another and timing constraints are likely to be imposed on the synchronization.

A timing constraint on synchronization of execution between the tasks can be decomposed into a set of timing constraints on each task, if the timing constraints are statically determined. However, with a job being scheduled dynamically, it is impossible to statically determine timing constraints of the tasks in the job.

Further, these scheduling methods do not have responsiveness for aperiodic tasks since they concentrate on periodic tasks. "Enhancing Aperiodic Responsiveness in a Hard Real-Time Environment", Proceeding of IEEE Real-Time Systems Symposium, 1987 by J. Lechoczky, et al. shows the sporadic server approach to solve aperiodic responsiveness of rate monotonic and deadline monotonic scheduling. Sporadic servers are executed periodically and if there are aperiodic tasks when a sporadic server is activated, the sporadic server will execute the aperiodic tasks within the time period reserved by the sporadic server.

This aspect is more critical on distributed object-oriented systems. As distributed object-oriented systems are developed in a way each object communicates with one another through message passing, multiple events of more than one object are apt to have timing constraints among themselves. Thus, timing constraints on distributed object-oriented computing systems have become one of the most important research areas. However, recent work on object-oriented real-time systems fails to address timing constraints on synchronization.

One of the real-time solutions of the distributed object-oriented systems is the Real-Time Objects (ROT) as described in "Temporal Uncertainties in Interactions Among Real-Time Objects", Proc. IEEE, 9th Symp. on Reliable Distributed Systems, pp. 165–174, October 1990 by H. Kopetz, et al. and "Consistency Constraints in Distrusted Real-Time Systems, in Distributed Computer Control Systems", 1988, N. G. Rodd and T. L. d'Epinay, et., Pergamon Press, pp. 29–34, 1989 by H. Kopetz, et al. and its extended version (RTO,k) as described in "A Real-Time Object Model RTO.k and an Experimental Investigation of Its Potentials", Proc. IEEE Computer Society's Computer Software and Applications Conf. (COMPSAC), November 1994 by K. Kim, et al. and "Distinguishing Features and Potential Roles of the RTIO.k Object Model", Int'l. Workshop on Object-Oriented Real-Time dependable Systems (WORDS'94), October 1994 by K. Kim, et al. RTO.k has the object structure in that each execution of a method may have a deadline. It is also possible to have time-triggered methods which are invoked automatically based on the wall clock time.

RTC++ as described in "Object-Oriented Real-Time Language Design: Constructs for Timing Constraints", ECOOP/OOPSLA proceedings, pp. 289–298, October 1990. by Y. Ishikawa, et al. and "An Object-Oriented Real-time Programming Language "IEEE Computer, pp. 66–73, October 1992 by Y. Ishikawa, et al. is an object-oriented real-time language based on C++ language. In RTC++, an object is able to have timing constraints. Such object is called real-time object. Similar to RTO, timing constraints are usually imposed on the execution of methods, but it is possible to impose a timing constraint on a specified command in the method as well.

A problem of both RTO and RTC++ is that they confine the timing constraints within objects in much the same way as representation of objects is hidden. However, encapsulating timing constraints in objects prevents programmers from specifying timing constraints on synchronization between objects. Thus, it is not possible to write such real-time computing systems.

The addressing of the coordination between more than one object can be found in the synchronizers described in "Inheritance of Synchronization Constraints in Concurrent Object-Oriented Programming Languages", ECOOP'92 European Conference on Object-Oriented Programming, O. Lehrmann, Madsen ed., Springer-Verlag, LNCS 615, pp. 185–196, June 1992 by S. Frolund and "A Language Framework for Multi-Object Coordination", Springer Verlag, LNCS 627, July 1993 by S. Frolund, et al. Synchronizers can impose a qualitative constraint on more than one object's execution by such constructs as an atomic operation. Although an atomic operation makes sure that multiple objects become runnable at one time, this does not necessarily mean that the objects execute at the same time. That is, Synchronizers do not impose quantitative constraints between objects.

RTsynchronizers is described in "RTsynchronizer: Language Support for Real-Time Specifications in Distributed Systems", ACM SIGPLAN Workshop on Languages, Compilers and Tools for Real-Time Systems (LCT-RTS'95), pp. 55–64, June 1995 by S. Ren, et al. are the extension of synchronizers, which specifies quantitative timing relation between objects. RTsynchronizers are, however, only the language constructs to specify timing constraints and lack the implementation aspects so as to support compilation and execution of real-time programs.

One approach to parallel and distrusted computing systems is based on the Actor Model as described in "Actors: A Model of Concurrent Computation in Distributed Systems", MIT Press, 1986 by G. Agha. Actors are a concept of objects which communicate with one another through asynchronous message passing. An actor programming environment supports three primitive operations as follows:

send operation: transmits an asynchronous message to another actor. Each message is sent to a mail queue of the destination actor and invokes a method at the destination.

new operation: creates another actor dynamically using a specification of the behavior of the actor.

become operation: changes an actor's local behavior. This state change only affects the next method to be processed.

Actors are used as a basic concept of parallel computation.

In constructing parallel and distributed computing systems, a barrier synchronization mechanism is often used for realizing synchronization or mutual exclusion between objects. The semantics of barrier synchronization is that it makes a specified set of tasks to be runnable after all those tasks have done specified prerequisite operations, usually after all those objects issue the barrier synchronization message operation.

The same semantics can be applied on an Actor Model but slightly differently. The semantics of barrier synchronization on an Actor Model is that it makes a set of factors be invoked with specified messages after all those messages are sent. The messages that trigger barrier synchronization are known as barrier messages.

To make barrier synchronization on an Actor Model more understandable, the term "thread" will be used for describing an actor's execution in terms of a control flow. FIG. 7 shows the concept of thread a1–a3 being executed by actors a1–a3 respectively. Message passing is the delegation of the control flow. Thus, the actors' executions along with the passing of messages are defined as a thread. More specifically, a thread is a chain of casually connected events or method invocations. We assume that threads also contain scheduling procedures in which the local schedulers choose a message to be invoked next. If an actor continues execution after sending a message, this will create another thread executing in parallel with the original thread. Each thread will terminate at the end of the method being executed.

In terms of a thread's execution, the control flow has been taken over by the method invoked by the messages and if this message is a barrier message, the thread will wait for execution of the other threads participating in the barrier synchronization. Thus, from the viewpoint of threads, barrier synchronization on an Actor Model is the same mechanism as in traditional control flow programs.

Barrier synchronization can be written within the framework of Synchronizers as described in "Inheritance of Synchronization Constraints in Concurrent Object-Oriented Programming Languages", ECOOP'92 European Conference on Object-Oriented Programming, O. Lehrmann, Madsen, ed. Springer-Verlag, LNCS 615, pp. 185–196, June 1992 by S. Frolund and "A Language Framework for Multi-Object Coordination", Springer Verlag, LNCS 627, July 1993 by S. Frolund, et al. The semantics of Synchronizers allows the writing of multi-object constraints for multiple actors. Specifically, it is possible to define an atomic operation on multiple invocations of the methods of actors. Thus, barrier synchronization between two actors can be written as follows:

Synchronizer synchands (Actor a1, a2) Atomic
   Atomic (a1.release (p1), a2.grab (p2));
   // p1 and p2 are parameters.
End synchands.

If it is assumed that actor a1 and actor a2 send themselves messages that invoke the release and grab actions of the robot described above respectively and any other actor does not invoke these methods. By using the Synchronizer it is possible to make actor a1 and actor a2 to be runnable after these actors issue barrier messages.

However, the steps performed in barrier synchronization are not sufficient to cause predictability in the behavior of the actors. Therefore, there is no real coordination or synchronization between the threads participating in the barrier synchronization.

The above-described methods which impose timing constraints on each real-time task cannot impose a timing constraint on coordination between tasks as required to effect real-time computing in distributed computing systems. If real-time tasks are statically schedulable (i.e., the time to pass the object 34 from robot arm 331 to robot arm 332 is statically determined), the timing constraint on the synchronization can be divided into timing constraints on each task. However, in the case where the time for robot arm 331 to release the object is determined dynamically, static decomposition of the constraint on synchronization of the execution of release and grab actions is not effective.

SUMMARY OF THE INVENTION

An object of the present invention is to provide an apparatus and method for synchronizing the execution of programs on a plurality of computers of a distributed computing system.

Another object of the present invention is to provide an apparatus and method for implementing real-time barrier synchronization of the execution of programs on a plurality of computers of a distributed computing system by dividing the specification of synchronization into two phases: one phase that deals with group scheduling and the other phase that schedules tasks locally given constraints imposed by the group scheduling operation.

Yet another object of the present invention is to provide an apparatus and method for implementing real-time barrier synchronization of the execution of programs on a plurality of computers of a distributed computing system by negotiating the execution time of the programs and scheduling the individual start times of the programs based on the negotiated execution time.

The present invention provides an apparatus and method for implementing real-time barrier synchronization of the execution of programs on a plurality of computers of a distributed computing system. Real-time barrier synchronization causes barrier synchronization of the execution of programs (threads) to be predictable by placing bounds on two important time values. One of the time values is earliest release time which is the delay from the time when the last program participating in the barrier synchronization issues a barrier message until one of the participating programs resumes its execution. The other time value is the release time skew which is the delay from the time when the first program participating in the barrier synchronization resumes its execution until all the programs resume their execution.

In the present invention in order to bound the above-described time values real-time barrier synchronization is implemented using two phases namely a negotiation phase and a scheduling phase. The negotiation phase determines the time when all programs participating in barrier synchronization resume their executions. The scheduling phase executes the programs locally based on the time constraints imposed by the negotiation phase.

Based on the above the present invention provides a distributed computing system including a plurality of computers. Each of the computers includes a local clock which is synchronized with the local clocks of the other computers and a start time determining apparatus for determining execution start time of a program to be executed by the computer. The program to be executed by the computer is executed in synchronism with programs in the other computers under timing constraints. The execution time is determined by the start time determining apparatus by negotiating with the start time determining apparatus of the other computers.

Each of the computers further includes scheduling apparatus for scheduling the execution of the program to be executed by the computer based on the execution time negotiated by the start time determining apparatus.

Further provided in each of the computers is a synchronized sporadic server which is executed periodically and at the same time as the execution of the synchronized sporadic servers on the other computers. The synchronized sporadic server supports the scheduling apparatus to schedule the execution of programs based on the timing constraints imposed by the start time determining apparatus.

The operation of the present invention is as follows:

(1) The start time determining apparatus of each computer sends a multicast message containing an estimated release time for the program to be executed by the computer to the other to the start time determining apparatuses of the other computers. The start time determining apparatus receives all the estimated release times for the programs to be executed by the other computers from the other start time determining apparatuses and determines the execution time at which all the programs participating in the synchronization are to be executed;

(2) The scheduling apparatus schedules the program based on the execution time determined by the start time determining apparatus; and (3) The synchronizing sporadic server is activated periodically and at the same time as the other synchronized sporadic servers and executes the programs participating in the synchronization based on timing constraints.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

The present invention is directed to an apparatus and method for synchronizing execution of programs in a distributed real-time computing system. Specifically, the present invention implements real-time barrier synchronization of the execution of programs on a plurality of computers of a distributed computing system by negotiating the execution time of the programs and locally scheduling the individual start times of the programs based on the negotiated execution time.

The following description of the present invention includes descriptions of real-time barrier synchronization and the factors affecting such synchronization, implementation of real-time barrier synchronization and the synchronization procedures, and the hardware configuration of a distributed real-time computing system according to the present invention.

1. Real-Time Barrier Synchronization

The same notation used to describe the atomic action of synchronizers barrier synchronization is used for describing real-time barrier synchronization on RTsynchronizers.

The notation is as follows:

RTsynchronizer synchands (actor a1, a2)

rtbarrier (a1.release (p1), a2.grab(p2));
end synchands,

Note that, however, it is also possible to determine the release times and the deadlines of barrier messages independently on timing constraints of barrier synchronization. The term "deadline" is defined as the latest time of method invocation. Since in an Actor Model the computation time is a deterministic function of incoming messages, the focus is on timing constraints on method invocations.

In the real-time environment, the semantics explained with respect to barrier synchronization is not enough to make temporal behavior of synchronized actors be predictable. If, for example, a node does not negotiate with other nodes after the barrier messages are sent, some of the threads participating in the barrier synchronization may have to wait for an unpredictably long period of time.

Figure 8:
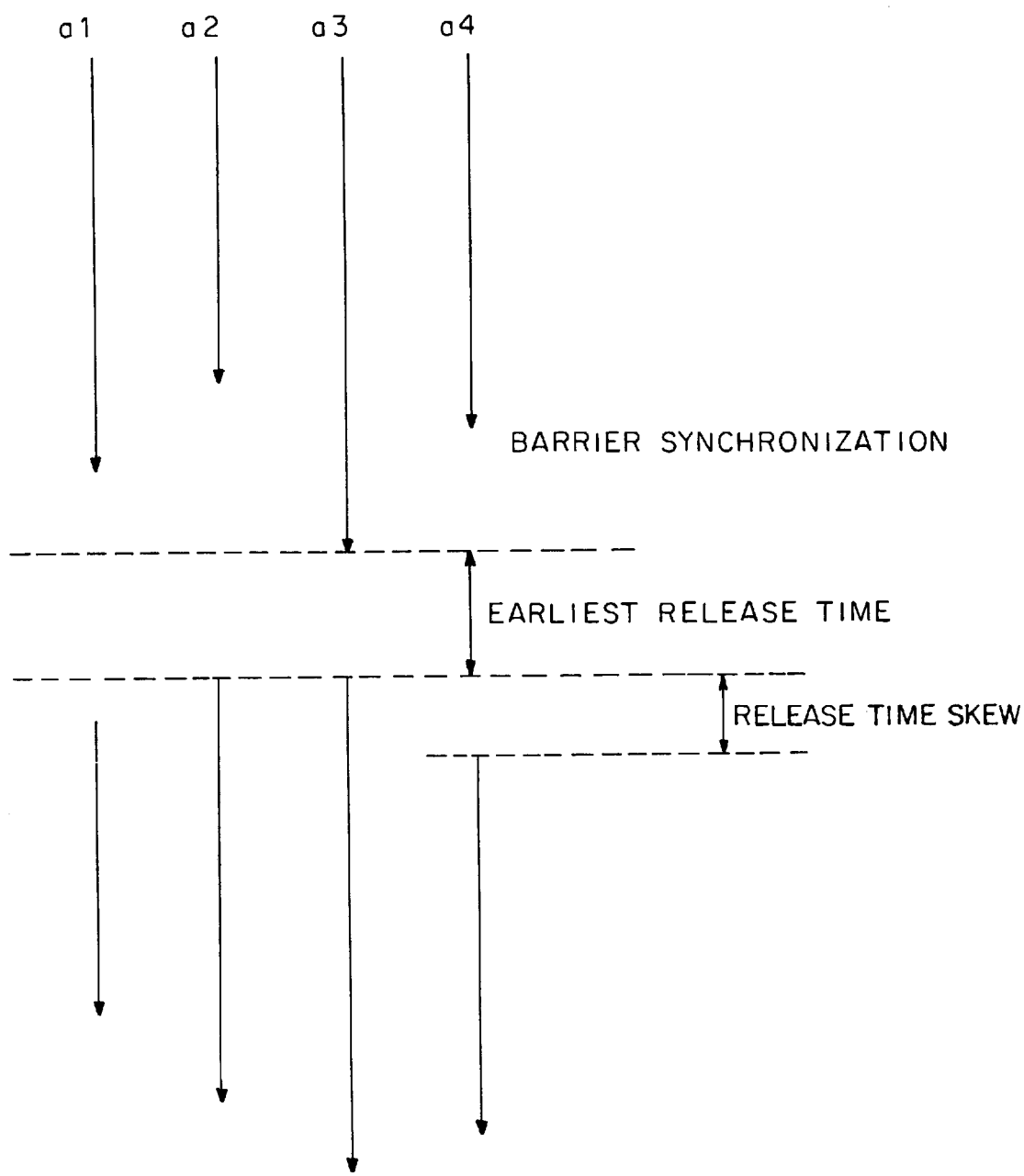
FIG. 8, is a diagram illustrating the time values to be bound in real-time barrier synchronization according to the present invention.

There are two time values that should be bound to make barrier synchronization predictable as illustrated in FIG. 8, among a plurality of threads a1–a3. The time values are as follows:

Earliest Release Time: is the delay from the time when the last thread participating in the barrier synchronization issues a barrier message, until one of the participating threads specifically a2 or a3 resumes its execution.

Release Time Skew: is the delay from the time when the first thread participating in the barrier synchronization resumes its execution, until all the threads resume their execution. The last thread to resume execution is a4. A barrier synchronization is real-time barrier synchronization if and only if earliest release time is bound by a predictable time value and release time skew is bound by a considerably short time value. A "considerably short" time value for the release time skew is a time value that does not effect execution and coordination of all the threads participating in the barrier synchronization.

Earliest release time is the time for bounding the time for processing barrier synchronization. The earliest release time makes sure that all the participating threads are to become runnable by a limited time. this time value is usually determined by the communication delay and the message loses (i.e., reliability of communication path.).

The release time skew is bound as well to make sure that all participating threads resume their execution almost at the same time. This is particularly useful when real-time systems designate simultaneous events where a specified set of events should all happen within a very short time period from each other. Release time skew is usually caused by the local clock skew and the local scheduling policy.

In order to bound release time skew, barrier synchronization (i.e., global synchronization) must interact with the local scheduling policy of each computer. One approach is to divide real-time barrier synchronization into two phases: (a) the negotiation phase and (b) the scheduling phase. The negotiation phase determines the time when all the threads participating in the barrier synchronization resume their executions. The scheduling phase executes the threads locally given the timing constraints imposed by the negotiation phase. By using this approach, only the negotiation phase deals with global scheduling and existing real-time uniprocessor scheduling (or real-time operation systems) is used in the scheduling phase.

As suggested earliest release time and release time skew are closely related to communication delay and reliability of communication paths, local clock skew and local scheduling policy, respectively. First the effects of these determining factors on real-time barrier synchronization will be examined before going into details of implementation.

One of the factors which determine earliest release time is communication delay. In real-time barrier synchronization, all participating threads will negotiate what time they are going to resume their executions. Earliest release time must be determined considering the time needed for this negotiation.

Figure 9:
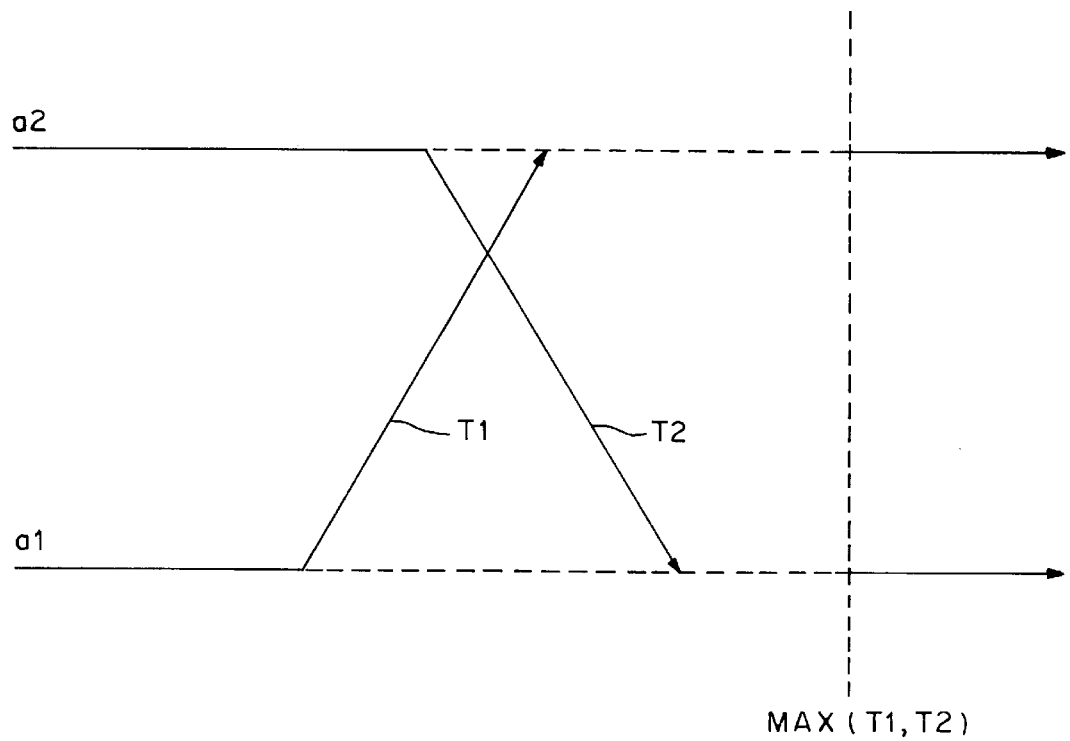
FIG. 9 is a diagram illustrating negotiation between actors according to the present invention.

FIG. 9 shows the basic idea of the negotiation procedure between two participating threads a1 and a2.

The negotiation procedure is as follows: Each thread sends the other participating threads a negotiation message T1 and T2 which includes the estimated resumption time when the receiving thread can resume its execution. The estimated release time should be calculated based on the communication delay between nodes. Each thread determines its release time after receiving all negotiation messages. The release time is computed by obtaining the maximum of the estimated resumption times. When the release time comes, all threads will resume their operations unless some of the messages are lost.

Earliest release time is also affected by the reliability of communication paths. If the communication paths are unstable, the negotiation messages can be lost.

Figure 10:
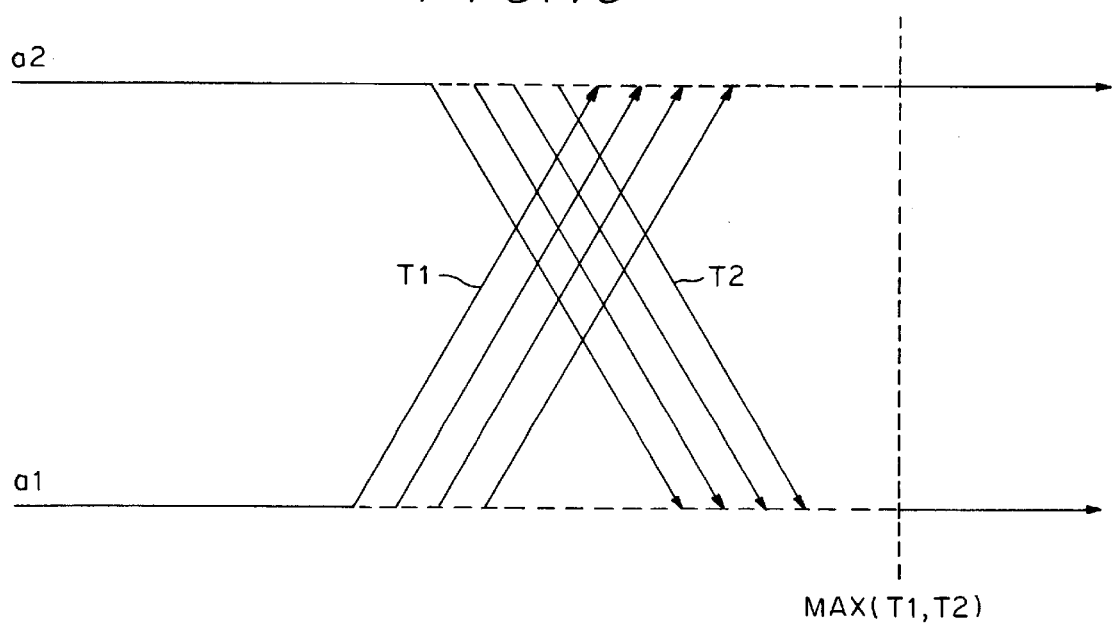
FIG. 10 is a diagram illustrating reliable communication between actors according to the present invention.

FIG. 10 shows a variant of the negotiation procedure illustrated in FIG. 9 to obtain reliable communication by sending sends multiple messages T1 and T2 in order to take message losses into account. The more likely messages are lost, the more messages have to be sent. If the possibility of message loss is almost zero due to the redundancy of communication paths, the negotiation between two threads will consist of two messages as illustrated in FIG. 9.

The threads participating in the barrier synchronization will first negotiate and determined their release time as described above. Even though they determine the same release time, local clock skew, if any, can affect release time skew.

If the local clock skew is too large, release time skew cannot fit in the desired time value. However, it is assumed that each local clock is closely synchronized with one another and the local clock skew is bounded by the limited time value of δ as described in "A New Probabilistic Algorithm for Clock Synchronization", Proc. IEEE Real-Time Systems Symp., pp. 330–339, December 1989 by G. Agha, "Optimal Clock Synchronization", J. ACM, Vol. 34, No. 7, pp. 626–645, July 1987 by T. K. Srikanth, et al., "Synchronization Issues in Real-Time Systems", Proc. IEEE, Vol. 82, No. 1, pp. 41–54, January 1994 by N. Sarin, et al. and "Synchronization of Fault-Tolerant Clocks in the Presence of Malicious Faults", IEEE Trans. Computers, Vol. 37, No. 4, pp. 440–448, April 1988 by N. Vasanthavada, et al.

The more important factor for determining release time skew is local scheduling policy of each computer. Even if all the threads participating in a barrier synchronization are made to be runnable at a certain time, it is not certain that all the threads actually begin to run because it depends on the local scheduling policies.

If one of the local schedulers found another thread with higher priority than the participating thread, the execution of the latter might be delayed and release time skew could be unpredictable.

The timing constraints imposed on the scheduling phase is usually determined dynamically in the negotiation phase. An extended approach to sporadic servers as described in "Enhancing Aperiodic Responsiveness in a Hard Real-Time Environment", Proc. IEEE Real-Time Systems Symp., December 1987, by J. Lechoczky, et al. so that release time skew is affected only by the local clock skew in such dynamically changing environment.

2. Implementation

If each of threads participating in the real-time barrier synchronization is statically schedulable, the barrier synchronization is also defined statically. However, this invention is not concerned with this statically schedulable situation because the same method as the static table-driven scheduling as described in "Allocation and Scheduling of Complex Periodic Tasks", 10th Int'l. Conf. on Distributed Computing Systems, June 1990 by K. Ramamrithan and rate monotonic/deadline monotonic scheduling as described in "Scheduling Algorithms for Multiprogramming in a Hard Real-Time Environment", J. ACM, Vol. 20, No. 1, pp. 46–61, January 1973 by C. L. Lin, et al. can be used after determining the synchronization point. However, note that on parallel and distributed systems rate monotonic/deadline monotonic scheduling is not the optimal method as described in "Multiprocessor Scheduling in a Hard Real-Time Environment", Proce. 7th Texas Conf. on Computer Systems, November 1978 by A. K. Mok. The necessary procedures for the static scheduling are: (1) dividing each thread into two method invocations, before and after the barrier synchronization, (2) defining the release times and the deadlines of the "the former parts" so that the "the latter parts" can execute at the same time, (3) and then "scheduling each task statically.

The present invention is particularly directed to dynamic scheduling for real time barrier synchronization. However, again note that if the threads are statically schedulable, it is always better to choose static scheduling. Dynamic scheduling has direct impact on the performance of computing systems. The present invention eliminates any negative impact dynamic scheduling may have on computing systems.

One of the software architectures suitable for implementing Actor Model or object oriented programming models with real-time scheduling, fault-tolerance and complex communication such as broadcast and multicast, is computational reflection as described in "Concepts and Experiments in Computational Reflection", Proc. OOPSLA-88, pp. 147, 155, 1988 by P. May. Reflection is a model where an object can manipulate a causally connected description (i.e. meta-object) of itself. A change of the meta-object results in a change of implementation or behavior of the object.

Figure 11:
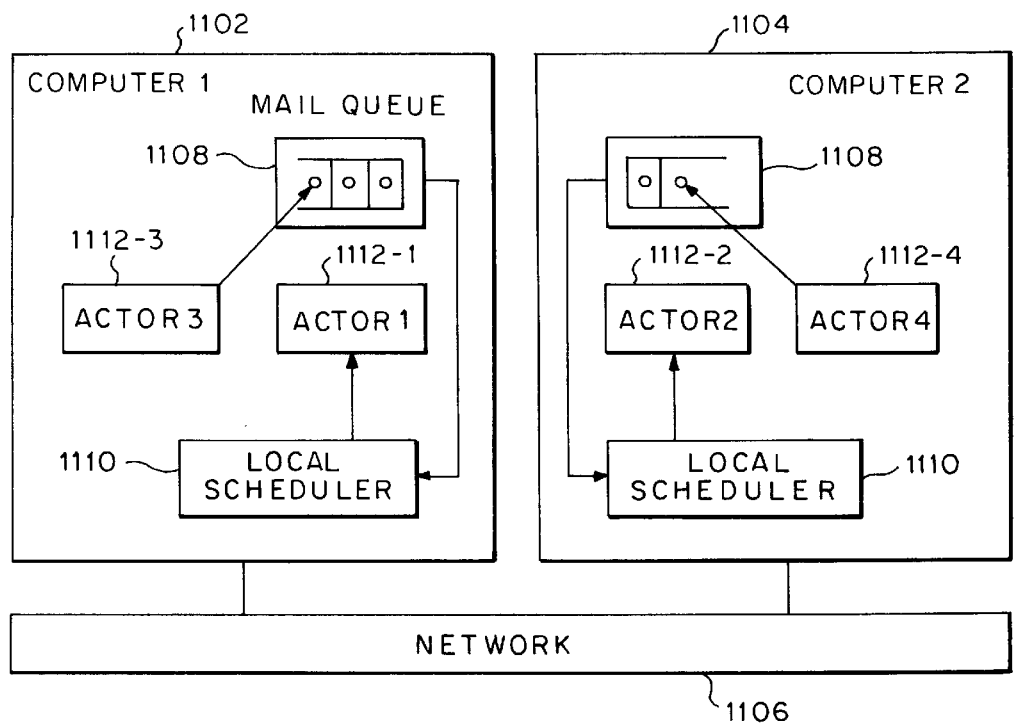
FIG. 11 is a schematic diagram illustrating a distributed computing system for implementing an actor model according to the present invention.

FIG. 11 illustrates apparatus for implementing an actor model. The apparatus includes a plurality of computers, computer 1 and computer 2, 1102 and 1104 respectively, connected to each other by a network 1106. Each computer includes a mail queue 1108, a local scheduler 1110 and at least one actor 1112-n. The actors 1112-1 through 1112-n are types of programs which act by communication with each other. The mail queue 1108 provided in each computer receives messages from the other actors 1112-n. In the apparatus if a message is a barrier message for triggering real-time synchronization according to the present invention the mail queue of a computer 1102 will invoke the local scheduler to synchronize the operation of the actor 1112 in the computer with the operation of other actors in the other computers. The local scheduler 1110 of the computer will negotiate with the other local schedulers 1110 of the other computers and invoke operation of the actor 1112 of the computer based on the timing constraints determined by the negotiation.

In the Actor Model, the mail queue 1108 of each computer is thought to be a meta-actor. By changing the data of the mail queue, for example, the execution of two method invocations can be reversed or a special method such as an emergency method can be invoked. The local schedulers having local scheduling policies are local scheduling meta-actors. The scheduling meta-actor of each computer and has the role of negotiating with the other scheduling meta-actors, determining the resumption time and allocating resources on the computer such as CPU and memory segments.

The procedure of real-time barrier synchronization on an actor model is as follows: Firstly, barrier messages are sent to the mail queue meta-actors. A part of each of the mail queue meta-actors implements an initial position of real-time barrier synchronization by performing pattern matching between the received messages and specifying patterns that require special treatment. If the received messages match the specified patterns of barrier synchronization, the mail queue meta-actors inform the scheduling meta-actors of the other participants of barrier synchronization. Upon receiving this information each scheduling meta-actor will negotiate with the other scheduling meta-actors and allocate resources on the computers based on the timing constraints imposed by the negotiation phase. If necessary, the scheduling meta-actor lets the mail queue meta-actor change the order of messages in the queue.

As described above, the implementation of real-time barrier synchronization basically consists of the negotiation phase and the scheduling phase. The negotiation phase is to decide the time when participating threads resume their operations. The scheduling phase is to resume all of the participating threads at the decided time.

The details of the real-time barrier synchronization is as follows: calculation of expected release time, reliable message sending, reception of synchronization messages, scheduling of actors and exception handling. The following is a description of these procedures.

a. Calculation of Expected Release Time

The step the scheduling meta-actor performs is to calculate the time at which the other threads participating in barrier synchronization can resume their executions. The calculation of estimated release time is fairly simple.

$$\text{Expected Release Time } (Tesp) = T + Dcomm + (Nmsg-1)*Drep + Trep + Dsched + Tskew$$

where,

T=Present Time

Dcomm=Worst Case Communication Delay

Nmsg=Number of Negotiation Messages

Drep=Delay between Negotiation Messages

Trep=Negotiation Message Handling Time

Dsched=Scheduling Delay, and

Tskew=Maximum Local Clock Skew

Figure 12:
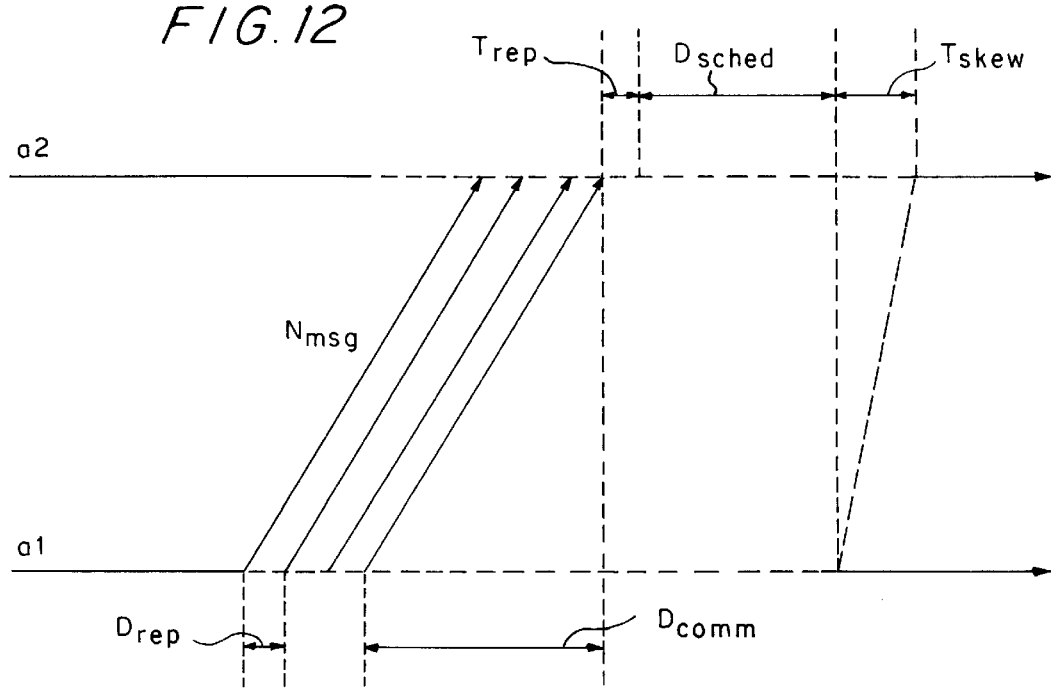
FIG. 12 is a diagram illustrating the calculation of an expected release time according to the present invention.

A graphical illustration of these parameters is provided in FIG. 12.

The worst case communication delay (Dcomm) itself has determining factors such as channel access delay, message delay, and topology. Network topology is the most difficult factor because if there is an intermediate node for a scheduling meta-actor to send a message to the destination meta-actor, the scheduling policy of the intermediate node must be taken into account. In this implementation, however, it is assumed that the intermediate node takes the message and forwards it to the destination within a limited period. Thus, the worst case communication delay is bounded.

The number of negotiation messages (Nmsg) and the delay between replicated negotiation messages (Drep) are determined statically by the reliability of communication paths so that at least one of the negotiation messages can arrive at the destination(s).

Message handling time (Trep) is the time from the reception of the negotiation message until the scheduler recalculates the release time based on the information from the message. Note that message handling occurs every time when it receives a negotiation message. However, only the last message is considered because the effect of the other messages can be hidden by the delay between replicated messages (Drep).

The scheduling delay (Dsched) is the estimated delay for the scheduling meta-actor to select a runnable actor and to execute it.

Finally, if the maximum local clock skew (Tskew) is taken into account, expected release time shown above will be the time when the other participating threads can resume their execution.

b. Reliable Message Sending

After calculating the estimated release time, each scheduling meta-actor will send it by a multicast message to the other scheduling meta-actors. If the probability of message loss of the network is not zero, more than one negotiation message is sent. It is not realistic to send a lot of negotiation messages, instead, only a few (two or three) messages are sent and continuous message loss is regarded as an exception of real-time barrier synchronization.

c. Reception of Synchronization Messages

After or before sending negotiation messages, each node may receive negotiation messages from the other scheduling meta-actors. Upon receiving a negotiation message, the node will calculate the release time by comparing its release time and the newly received estimated release time. If the newly received release time is greater (i.e. more future, or, to happen later) than the release time, the received estimated release time will be assigned as the release time.

If the same message is received from the same node due to the reliable message passing, the receiving meta-actor may just ignore the message.

d. Scheduling of Actors

When a scheduling meta-actor receives at least one multicast message from each scheduling meta-actor, the release time will be decided for the participating thread.

The easiest implementation of this scheduling function is to deploy table-driven scheduling dynamically. Table-driven scheduling is often used for static scheduling. But in this case, the scheduling table not only memorizes the invocation time and the worst case execution time of the statically analyzed actors but also dynamically remembers those of the actors invoked by barrier messages. As clocks advance, the local scheduling meta-actors execute actors on their computers based on their own scheduling tables.

However, this approach is not flexible. If the calculated release time does not fit in the scheduling table (or if the superposition of all the scheduling tables does not allow any simultaneous method invocation), timing constraints of real-time barrier synchronization will not be satisfied. Moreover, not all the actors require the timing constraints and need to be specified in the scheduling table.

To account for the above a synchronized sporadic server is used to make the scheduling more flexible. Synchronized sporadic servers according to the present invention are extensions of the sporadic server policy as described in "Enhancing Aperiodic Responsiveness in a Hard Real-Time Environment", Proc. IEEE Real-Time Systems Symp., December 1987, by J. Lehoczky, et al. which provide good responsiveness for aperiodic tasks. Since it is assumed that each synchronized local clock is synchronized with one another, the synchronized sporadic servers will be activated simultaneously on each node if they are scheduled to execute at the same wall clock time. Actors invoked by barrier messages are regarded as aperiodic tasks. By redefining the release time using the earliest activation time of the synchronized sporadic servers, it is possible to incorporate the activation time of synchronized sporadic servers in the scheduling delay (Dsched) when calculating the estimated release time.

The synchronized sporadic server approach according to the present invention is also very applicable to the other synchronization patterns. Even though the negotiation phase determines the different release times for the participating actor, they can be scheduled on the servers if the relative release times from the activation time of synchronized sporadic servers are fixed.

e. Exception Handling

An exception occurs when all the messages from a node have vanished. Interestingly, this situation is almost the same as where the deadline of a barrier message, if any, is violated. In the former case, the message from the node, whose messages are all lost, will never arrive at the destination. In the latter case, however, the negotiation messages from the node, on which the deadline of the barrier message is violated, will not arrive at the destination node prior to the time Tesp where Tesp is a deadline of the barrier message plus communication delay.

Thus, each scheduling meta-actor creates the exception condition that the exception handler is invoked when the scheduler does not receive any negotiation message from a node by Tesp.

The job of exception handling depends on the nature of applications, namely whether the system is hard real-time or soft real-time, whether all participating threads should be cancelled if a thread violates timing constraints, and so on. But, it should be noted that the other threads participating in barrier synchronization have already resumed their execution when the exception handler is activated due to the message losses. When activated due to the deadline violation, the participating threads do not have any obligation to wait for the thread violating the timing constraint. So, the easiest way of exception handling is just to remove the timing constraints on the thread and to make it runnable.

f. Hardware Configuration

Figure 1:
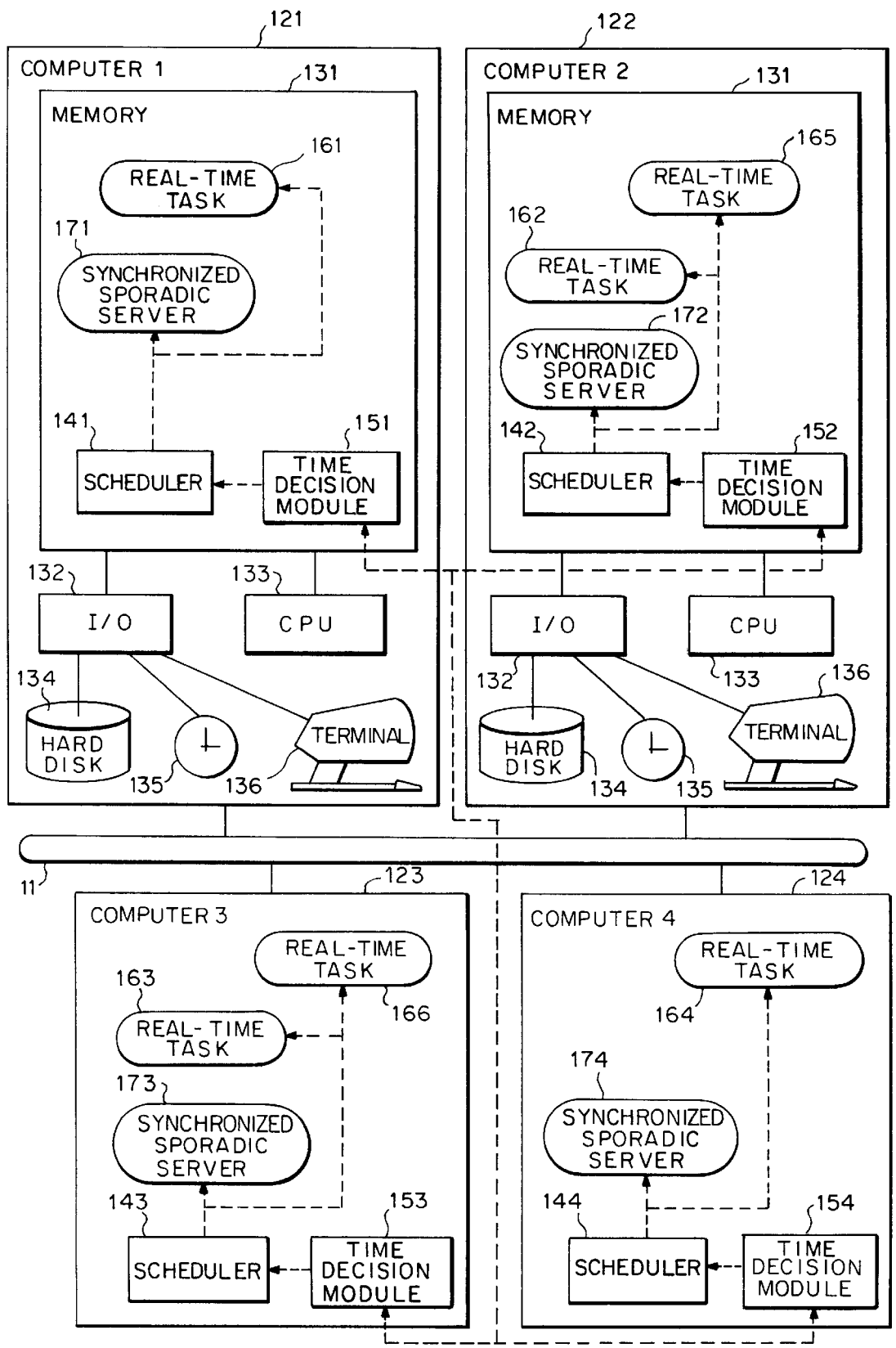
FIG. 1 is a schematic diagram illustrating the configuration of a distributed computing system according to the present invention.

FIG. 1 shows the hardware configuration of a distributed computing system according to an embodiment of the present invention. In this system, a plurality of computers 121–124 are connected to a network 11 such that real-time tasks run on the respective computers in cooperation with each other. While only four computers are shown connected in the system of FIG. 1, a number of computers larger than or smaller than this configuration may be employed to constitute a system. The network 11 may include a communication bus, optical fibers, cross-bar coupling network, and so on.

Real-time task on the respective computers communicate with each other through the network 11. Each real-time task may have its own timing constraints and if they are synchronized with each other, the real-time tasks may have timing constraints on the synchronization. Details of the internal configuration are shown only for the computers 121 and 122. Each of the computers comprises a main memory unit 131, input/output control unit 132, central processing unit 133, and so on. Each unit receives data from and transmits data to the other units and processes tasks on the main memory unit 131. The input/output control unit 132 in each computer is generally connected to an external storage 134, a local clock 135 and a terminal 136, respectively, for receiving and forwarding data from and to the outside of the computer. The value of the local clock can be mapped on the specified addresses of the main memory unit, and thus, the local clock can be read by the tasks easily. The values of the local clocks are synchronized with each other and the clock skew of the local clocks are almost zero. A method for synchronizing local clocks on distributed computing systems is described in "A New Probabilistic Algorithm for Clock Synchronization", Proceedings of IEEE Real-Time Systems Symposium, 1989 by K. Arvind.

The main memory units 131 contain user programs (real-time tasks) 161–166, synchronized sporadic sensors 171–174, schedulers 141–144, and time decision modules 151–154, all of which are processed by the central processing units 133 of the respective computers. Real-time tasks 161–166 are executed either independently or synchronized with each other. The number of real-time tasks and how to locate them to the respective computers may be arbitrarily determined by the user. Generally, each computer is provided with its own operating system for managing executions of programs and the other conditions on the associated computer. The schedulers, the time decision modules and the synchronized sporadic servers are proposed for the purpose of the real-time processing and therefore are not usually included in the ordinary operations systems. However, they can be provided as functions of a special operating system for real-time processing. In FIG. 1, the description of the operating system is omitted.

Figures 2, 3:
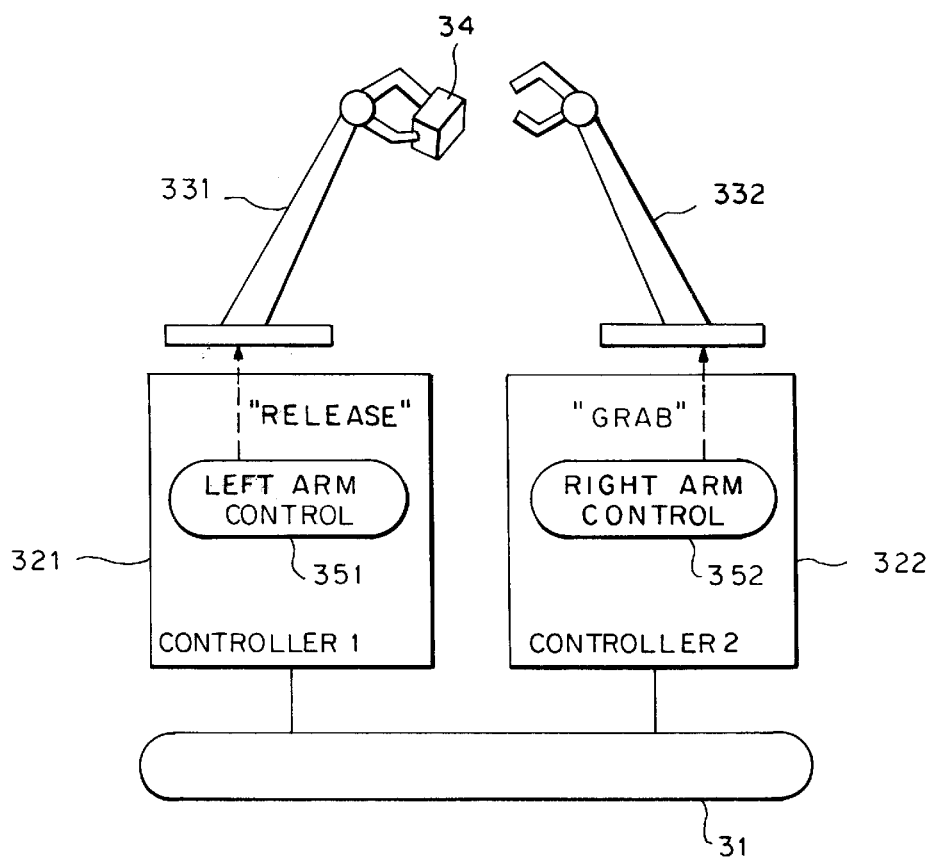
FIG. 2 illustrates by a table examples of timing constraints of real-time tasks.
FIG. 3 is a schematic diagram illustrating an example of a real-time distributed computing system such as a robot.

Generally, real-time tasks 161–166 have two kinds of timing constraints shown in FIG. 2. Simple timing constraints are imposed on each real-time task separately. The examples of this type of timing constraints are task release time ("When should this real-time task be executed?") and deadline ("By when should this real-time task complete its process?"). As described above, rate monotonic scheduling and deadline monotonic scheduling are concerned only with the simple static timing constraints. However, when introducing real time into distributed computing systems, a plurality of real-time tasks are executed cooperatively with each other. Thus, the imposition of timing constraints on this synchronization between a plurality of tasks is required.

An example of timing constraints on synchronization between real-time tasks is illustrated in FIG. 3. FIG. 3 is a diagram of a real-time distributed computing system which controls the robot arms 331 and 332. In this example, the robot arm 331 will pass the object 34 to another robot arm 332 dynamically. The computing system which controls these robot arms is a small distributed computing system that comprises a network 31 and controller 321 and 322. Each controller has a real-time task (left arm control task 351 and right arm control task 352) to control the respective robot arm. Here, to pass the object 34 without dropping from the robot arm 331 to robot arm 332, the release action and the grab action of the left and the right robot arms 331 and 332 should occur at the same time. This means that the timing constraint in which the left arm control task 351 and the right arm control task 352 occurs almost simultaneously must be imposed.

These kinds of timing constraints are described in FIG. 2 as synchronized timing constraints. Similarly, to execute a plurality of tasks with fixed time difference between the execution times is also a synchronized timing constraint. Such synchronized timing constraints cannot be decomposed into simple timing constraints statically, if the execution of real-time tasks is determined dynamically.

The real-time schedulers 141–144, the time decision modules 151–154 and the synchronized sporadic servers 171–174 are the means to realize such synchronized timing constraints. The dotted line in FIG. 1 shows the processing flow to realize synchronized timing constraints. First of all, the time decision modules 151–154 negotiate with each other and determine the release time of the real-time tasks participating in the synchronization. Based on the time determined by the time decision module, each scheduler 141–144 will execute the real-time tasks 161–166 locally on each computer. Here, if each time decision module 151–154 informs the scheduler of different release times, it is possible to execute real-time tasks with a fixed gap on the release times. The synchronized sporadic servers 171 174 are special real-time tasks. The roles of the synchronized sporadic servers are to reserve the same time period on each computer and to execute real-time tasks with synchronized timing constraints on them.

Figure 4:
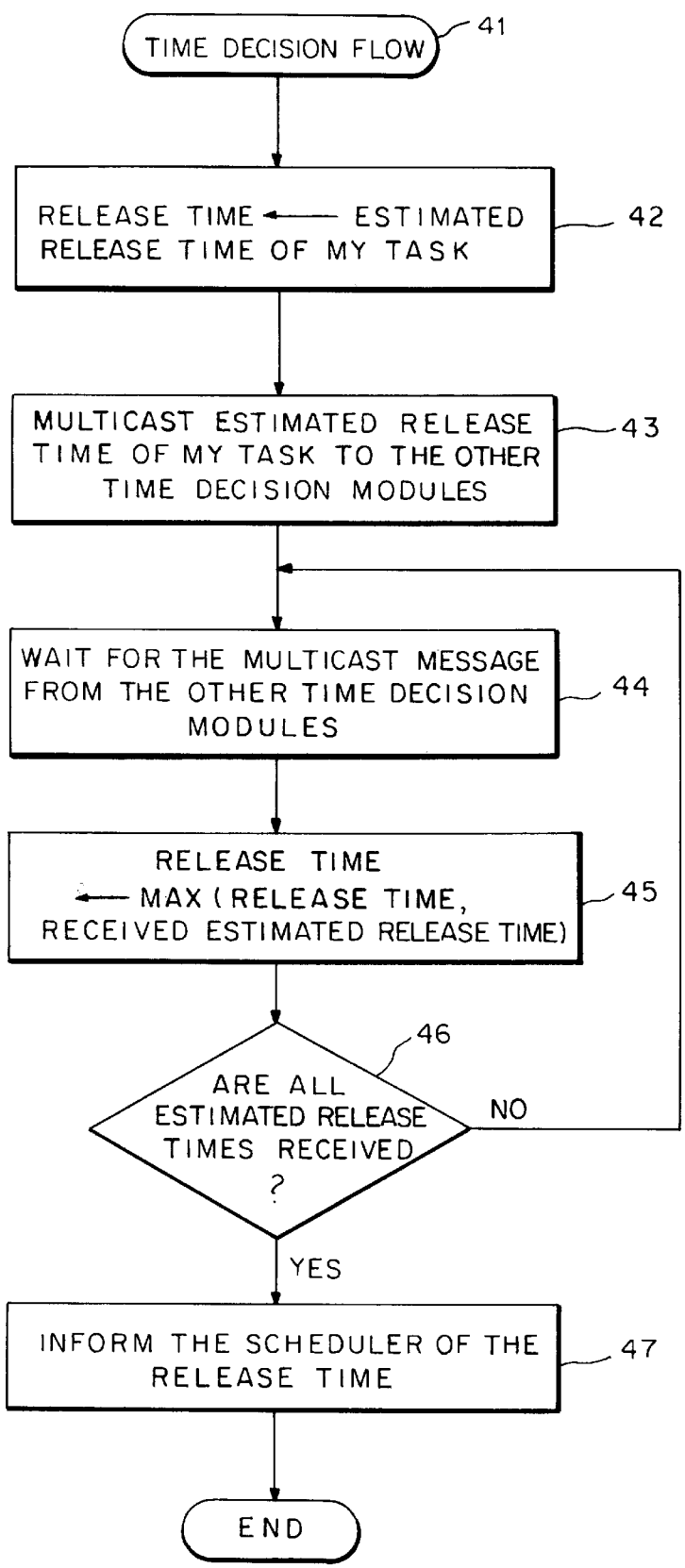
FIG. 4 is a flow chart of the operations performed by each start time determining apparatus of the present invention.

FIG. 4 shows the flow chart 41 of the process of the time decision modules. When a real-time task requires a synchronized timing constraint with the other real-time tasks, the time decision module on the same computer is activated. At first, the time decision module calculates the estimated release time of the real-time task on the same computer and stores it as the release time (step 42). The calculation method of estimated release time will be described in FIG. 5 later. However, the estimated release time shows the time on which the other computer can execute the real-time task. The time decision module then sends the other time decision modules a multicast message that contains the estimated release time (step 43). If it receives a multicast message (step 44), it recalculates the release time by selecting the maximum value between the previous release time and the received estimated release time (step 45). By receiving all the estimated release times from the other time decision modules, it can calculate the maximum estimated release time (step 46). Since all the time decision modules calculate the maximum estimated release time, the time decision modules can agree with one fixed release time for real-time tasks participating in the synchronization. The time decision module will inform the real-time scheduler of the release time. If it is desirable to execute real-time tasks with a fixed gap on the release time, the time decision module can inform the real-time scheduler of the standard release time (which is determined by the negotiation between the time decision modules) and the offset (which is determined statically).

Figure 5:
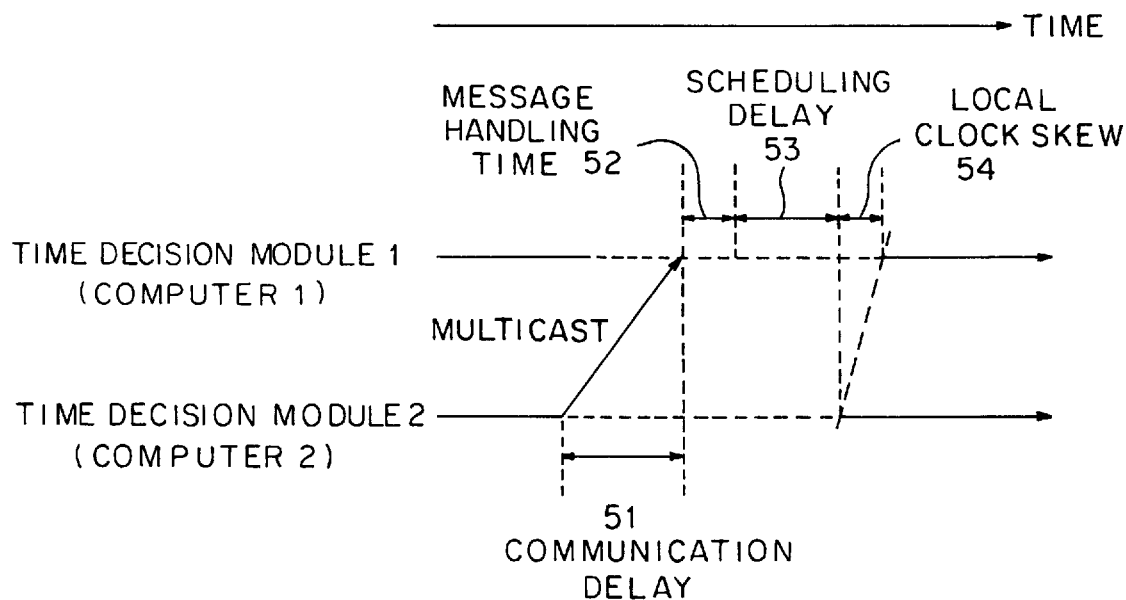
FIG. 5 is a timing diagram which illustrates operations performed to compute the estimated release time of the present invention.

FIG. 5 shows how to calculate the estimated release time on each computer. Here, FIG. 5 shows the case where the time decision module on computer 2 calculates the estimated release time. Time S1 is maximum communication delay, within which the multicast message arrives at the destination computer (in this case computer 1). Time 52 is the multicast message handling time, within which the received multicast message is passed to the time decision module. Time 53 is scheduling delay within which the real-time scheduler can actually execute the real-time task after receiving the release time. Time 54 is the maximum skew between the local clocks. Each time can be calculated statically with the software/hardware configuration of the real-time distributed computing system. By adding times 51–54 to the current time, it is possible to calculate the estimated release time. If the time earlier than the estimated release time is specified, some computers may not able to execute the real-time task on time.

The real-time scheduler will execute based on the timing constraint determined by the time decision module. Here, the release time specified by the time decision module may be reserved by the other real-time task (whose timing constraints are determined independently) if more than one real-time task is executed on the same computer. In this case, either the real-time scheduler cannot execute the real-time task with synchronized timing constraints, or it may violate another tuning constraint imposed on the other real-time task.

It is possible to activate the time decision module again if the release time is already reserved by the other real-time task and the scheduler cannot execute the real-time task on time. However, since this feedback may cause another feedback, this method is not necessarily good. The present invention introduces the synchronized sporadic servers for solving this problem. The synchronized sporadic servers are activated periodically and at the same time on each computer. In short, the synchronized sporadic servers have the role to reserve the time period "at the same time" on each computer and to allocate such period on real-time tasks with synchronized timing constraints.

Figure 6:
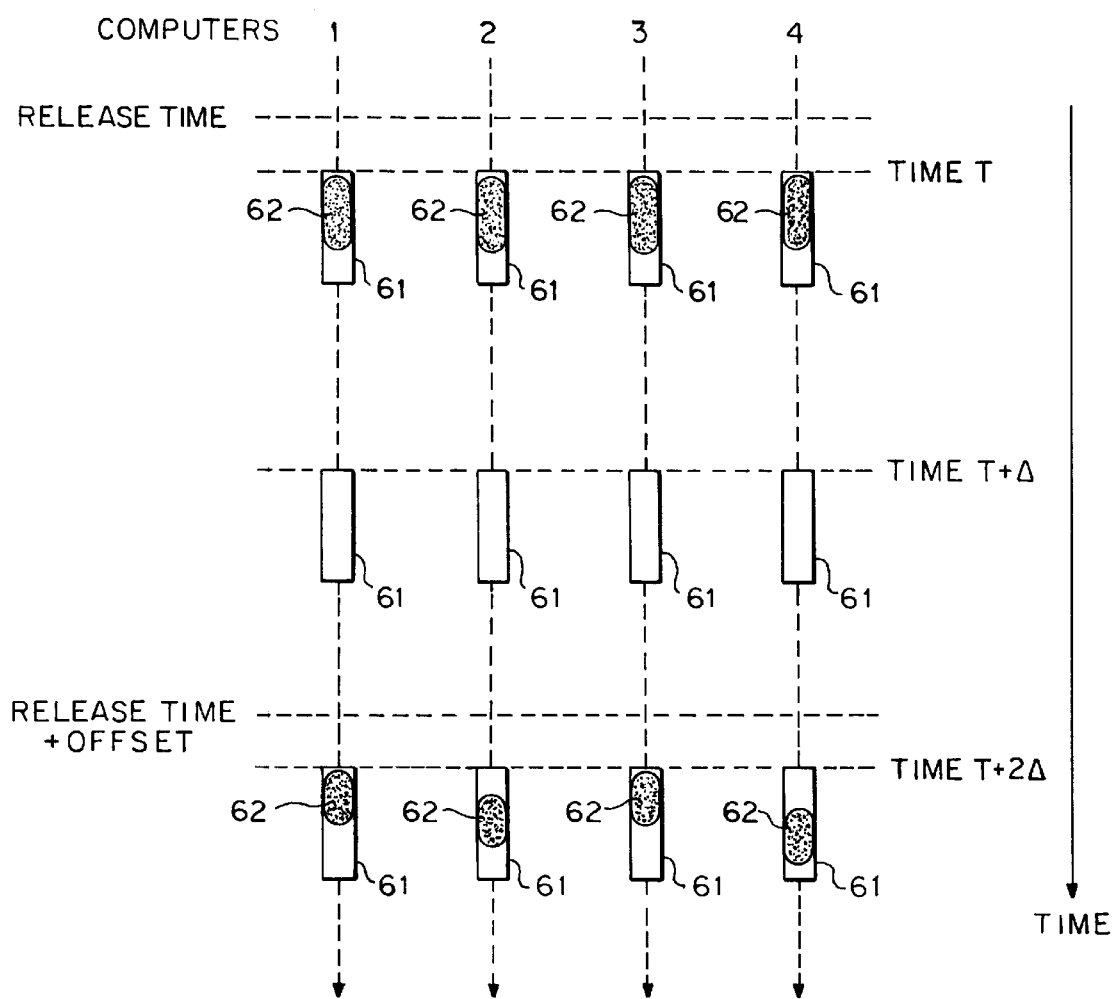
FIG. 6 is a timing diagram which illustrates an example of the action of synchronized sporadic servers of the present invention.
Figure 7:
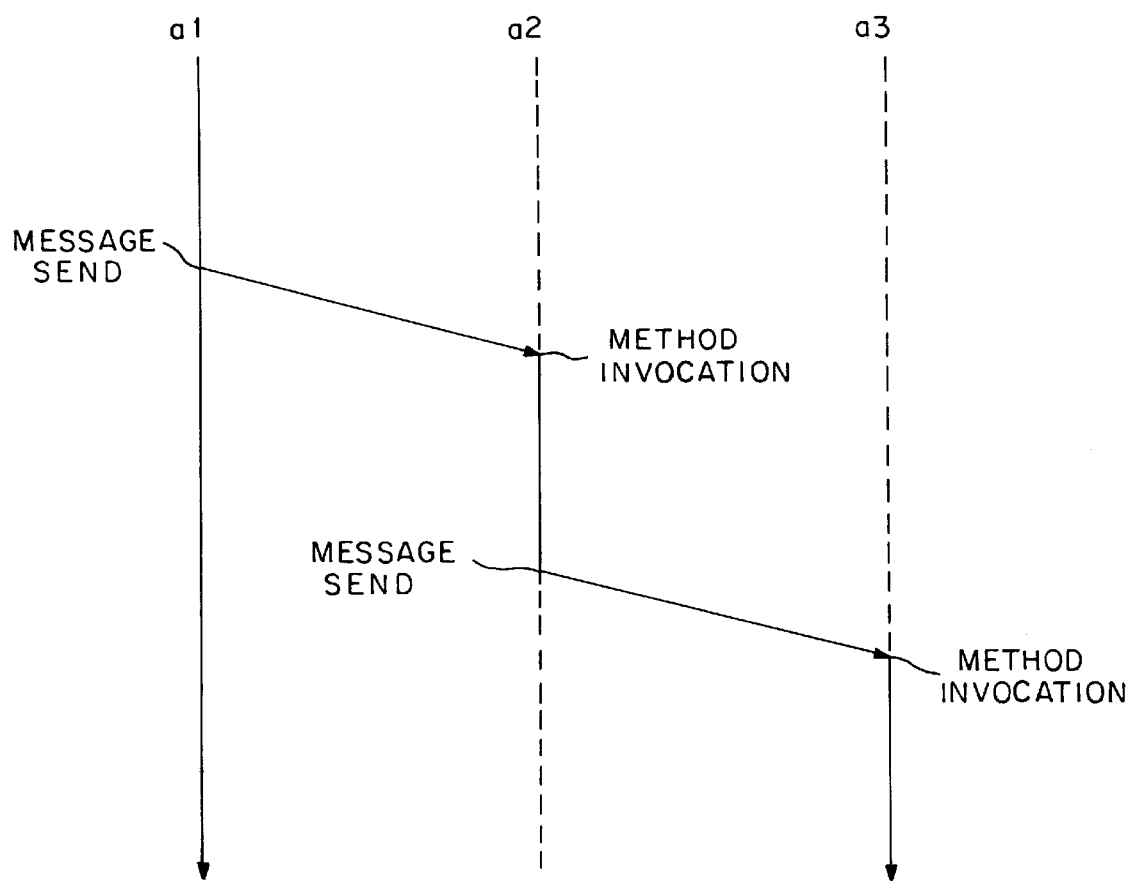
FIG. 7 is a diagram illustrating the execution of threads and the invocation of barrier sychronization.

FIG. 6 shows an example of the action of synchronized sporadic server. FIG. 6 is the example on the distributed computing system containing four computers. The synchronized sporadic servers 61 are activated at the same time on each computer. Also the synchronized sporadic servers 61 are activated periodically. As each computer's local clock is synchronized with each other, the simultaneous activation of the synchronized sporadic servers 61 are realized if the synchronized sporadic servers 61 are activated periodically according to each computer's local clock. It is possible to execute real-time tasks only with simple timing constraints while the synchronized sporadic servers 61 are not reserving the time.

When the real-time scheduler receives the release time from the time decision module, the scheduler allocates the real-time tasks 62 on the synchronized sporadic servers 61 which comes first from the release time. It is also possible to make the gap between the release time of each real-time task by allocating them differently on each synchronized sporadic server 61.

As stated above, by utilizing the time decision modules, the real-time schedulers and the synchronized sporadic servers, it is possible to realize not only simple timing constraints but also synchronized timing constraints on distributed real-time computing systems. In other words, the present invention can realize timing constraints on the synchronization between real-time tasks being executed on a plurality of computers in distributed computing systems.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. The distributed computing system, each computer having a local clock which is synchronized with local clocks on the other computers, said each computer comprising:

a synchronized sporadic server program which is executed periodically by said computer and at the same time as executed periodically by said computer and at the same time as synchronized sporadic server programs being executed by the other computers, said synchronized sporadic server program causes execution of a program by said computer having timing constraints to effect synchronization with programs to be executed by the other computers, said programs to be executed by the other computers are caused to be executed by said synchronized sporadic server programs being executed by the other computers in a manner according to said timing constraints;

start time determining means for calculating an execution start time of a program to be executed by said computer, receiving calculated execution start times of programs to be executed by the other computers, and determining an execution start time of said program to be executed by said computer based on the calculated execution start times of said programs to be executed by the other computers, said program to be executed by said computer has timing constraints to effect synchronization with said programs on the other computers; and scheduling means for executing said program to be executed by said computer on said synchronized sporadic server program according to said offset from the execution start time of said program to be executed by said computer.

2. The distributed computing system, each computer having a local clock which is sychronized with local clocks on the other computers, said each computer comprising:

a sychronized sporadic server program which is executed periodically by said computer and at the same time as synchronized sporadic server programs being executed by the other computers, said synchronized sporadic server program causes execution of a program by said computer having timing constraints to effect synchronization with programs to be executed by the other computers, said programs to be executed by the other computers are caused to be executed by said synchronized sporadic server programs being executed by the other computers in a manner according to said timing constraints;

start time determining means for calculating an offset from a standard execution time of a program to be executed by said computer, receiving calculated offsets from standard execution start times of programs to be executed by the other computers, and determining an offset from a standard execution start time of said program to be executed by said computer based on the calculated offset from standard execution start times of said programs to be executed by the other computers, said program to be executed by said computer has timing constraints to effect synchronization with said programs on the other computers;

scheduling means for executing said program to be executed by said computer on said synchronized sporadic service program according to said offset from the execution start time of said program to be executed by said computer.

* * * * *